United States Patent [19]

Winter et al.

[11] 4,440,628

[45] Apr. 3, 1984

[54] CATALYTIC REFORMING PROCESS

[75] Inventors: William E. Winter; Gerald E. Markley, both of Baton Rouge, La.

[73] Assignee: Exxon Research and Engineering Co., Florham Park, N.J.

[21] Appl. No.: 482,511

[22] Filed: Apr. 6, 1983

Related U.S. Application Data

[63] Continuation-in-part of Ser. No. 473,954, Mar. 10, 1983, abandoned, which is a continuation-in-part of Ser. No. 409,073, Aug. 18, 1982, which is a continuation-in-part of Ser. No. 336,495, Dec. 31, 1981.

[51] Int. Cl.$^3$ ............................................. C10G 35/06
[52] U.S. Cl. ...................................... 208/65; 208/64; 208/138; 208/139
[58] Field of Search .................... 208/64, 65, 138, 139

[56] References Cited

U.S. PATENT DOCUMENTS

| | | | |
|---|---|---|---|
| 3,415,737 | 12/1968 | Kluksdahl | 208/138 |
| 3,516,924 | 6/1970 | Forbes | 208/65 |
| 3,544,451 | 12/1970 | Mitsche et al. | 208/138 |
| 3,660,271 | 5/1972 | Keith et al. | 208/65 |
| 3,705,094 | 12/1972 | Keith et al. | 208/65 |
| 3,943,050 | 3/1976 | Bertolacini | 208/65 |
| 4,155,834 | 5/1979 | Gallagher | 208/65 |
| 4,167,473 | 9/1979 | Sikonia | 208/64 |
| 4,174,270 | 11/1979 | Mayes | 208/64 |
| 4,356,081 | 10/1982 | Gallagher et al. | 208/139 |

OTHER PUBLICATIONS

European 0027384 A1, J. Mooi et al.

*Primary Examiner*—Curtis R. Davis
*Attorney, Agent, or Firm*—Llewellyn A. Proctor

[57] ABSTRACT

A process wherein, in a series of reforming zones, or reactors, each of which contains a bed, or beds of catalyst, the catalyst in the rearward most reforming zones is constituted of a high rhenium, platinum rhenium catalyst, viz., a catalyst comprising supported platinum and a relatively high concentration of rhenium relative to the platinum, and preferably the catalyst in the forwardmost reforming zone, or reactor of the series, is constituted of platinum, or platinum and a relatively low concentration of rhenium relative to the platinum. At least 30 percent, preferably from 40 percent to about 90 percent, of the rearward most reactors of the unit, or even 100 percent, based on the total weight of the catalyst in all of the reactors of the unit, contain a high rhenium, platinum rhenium catalyst, the weight ratio of rhenium:platinum being at least about 1.5:1. The beds of catalyst are contacted with a hydrocarbon or naphtha feed, and hydrogen, and the reaction continued for a period of at least 700 hours, preferably from about 700 hours to about 2750 hours, while conducting the reaction at temperatures ranging from about 850° F. to about 950° F. (E.I.T.), at pressures ranging from about 150 psig to about 350 psig, and at gas rates ranging from about 2500 SCF/B to about 4500 SCF/B.

34 Claims, No Drawings

CATALYTIC REFORMING PROCESS

RELATED APPLICATIONS

This is a continuation-in-part of application Ser. No. 473,954, filed Mar. 10, 1983, and now abandoned, which is a continuation-in-part of application Ser. No. 409,073, filed Aug. 18, 1982, which in turn is a continuation-in-part of application Ser. No. 336,495, filed Dec. 31, 1981.

This application contains subject matter which is related to that found in application Ser. No. 082,804 by George A. Swan, filed Oct. 9, 1979; application Ser. No. 082,805 by Soni O. Oyekan and George A. Swan, filed Oct. 9, 1979; and application Ser. No. 271,528 by George A. Swan, filed June 8, 1981 and now abandoned.

BACKGROUND OF THE INVENTION AND PRIOR ART

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

Platinum has been widely commercially used in recent years in the production of reforming catalysts, and platinum-on-alumina catalysts have been commercially employed in refineries for the last few decades. In the last decade, additional metallic components have been added to platinum as promotors to further improve the activity or selectivity, or both, of the basic platinum catalyst, e.g., iridium, rhenium, tin, and the like. Some catalysts possess superior activity, or selectivity, or both, as contrasted with other catalysts. Platinum-rhenium catalysts by way of example possess admirable selectivity as contrasted with platinum catalysts, selectivity being defined as the ability of the catalyst to produce high yields of $C_5+$ liquid products with concurrent low production of normally gaseous hydrocarbons, i.e., methane and other gaseous hydrocarbons, and coke.

In a conventional process, a series of reactors constitute the heart of the reforming unit. Each reforming reactor is generally provided with a fixed bed, or beds, of the catalyst which receive downflow feed, and each is provided with a preheater or interstage heater, because the reactions which take place are endothermic. A naphtha feed, with hydrogen, or recycle hydrogen gas, is concurrently passed through a preheat furnace and reactor, and then in sequence through subsequent interstage heaters and reactors of the series. The product from the last reactor is separated into a liquid fraction, and a vaporous effluent. The former is recovered as a $C_5+$ liquid product. The latter is a gas rich in hydrogen, and usually contains small amounts of normally gaseous hydrocarbons, from which hydrogen is separated and recycled to the process to minimize coke production.

The activity of the catalyst gradually declines due to the build-up of coke. Coke formation is believed to result from the deposition of coke precursors such as anthracene, coronene, ovalene and other condensed ring aromatic molecules on the catalyst, these polymerizing to form coke. During operation, the temperature of the process is gradually raised to compensate for the activity loss caused by the coke deposition. Eventually, however, economics dictate the necessity of reactivating the catalyst. Consequently, in all processes of this type the catalyst must necessarily be periodically regenerated by burning off the coke at controlled conditions.

Two major types of reforming are broadly practiced in the multi reactor units, both of which necessitate periodic reactivation of the catalyst, the initial sequence of which requires regeneration, ie., burning the coke from the catalyst. Reactivation of the catalyst is then completed in a sequence of steps wherein the agglomerated metal hydrogenation-dehydrogenation components are atomically redispersed. In the semi-regenerative process, a process of the first type, the entire unit is operated by gradually and progressively increasing the temperature to maintain the activity of the catalyst caused by the coke deposition, until finally the entire unit is shut down for regeneration, and reactivation, of the catalyst. In this type of operation, the reactors remain on stream for very long periods prior to catalyst regeneration, and reactivation, usually several hundred hours or more, e.g., at least about 700 hours, more often 2200 hours, or more. In the second, or cyclic type of process, the reactors are individually isolated, or in effect swung out of line by various manifolding arrangements, motor operated valving and the like. The catalyst is regenerated to remove the coke deposits, and then reactivated while the other reactors of the series remain on stream. A "swing reactor" temporarily replaces a reactor which is removed from the series for regeneration and reactivation of the catalyst, until it is put back in series. Whereas the individual reactors remain on stream for periods of different length depending on their position in the series, rarely if ever do any remain on stream for as long as 200 hours prior to catalyst regeneration, and reactivation. In some reforming units, features of the semi-regenerative operation are found in conjunction with cyclic operations. These operations, termed "semi-cyclic," also necessitate that some of the reactors remain on-oil for long periods, typically from 700 hours to 1400 hours, prior to regeneration and reactivation of the catalyst.

Various improvements have been made in such processes to improve the performance of reforming catalysts in order to reduce capital investment or improve $C_5+$ liquid yields while improving the octane quality of naphthas and straight run gasolines. New catalysts have been developed, old catalysts have been modified, and process conditions have been altered in attempts to optimize the catalytic contribution of each charge of catalyst relative to a selected performance objective. Nonetheless, while any good commercial reforming catalyst must possess good activity, activity maintenance and selectivity to some degree, no catalyst can possess even one, much less all of these properties to the ultimate degree. Thus, one catalyst may possess relatively high activity, and relatively low selectivity and vice versa. Another may possess good selectivity, but its selectivity may be relatively low as regards another catalyst. Platinum-rhenium catalysts, among the handful of successful commercially known catalysts, maintain a rank of eminence as regards their selectivity; and they have good activity. Nonetheless, the existing world-wide shortage in the supply of high octane naphtha persists and there is little likelihood that this shortage will soon be in balance with demand. Consequently, a relatively small increase in the $C_5+$ liquid yield can represent a large credit in a commercial reforming operation.

Variations have been made in the amount, and kinds of catalysts charged to the different reforming reactors of a series to modify or change the nature of the product, or to improve $C_5+$ liquid yield. Different catalysts, with differing catalytic metal components, have also been used in the different reactors of a series. The concentrations of the catalytic metal components on catalysts containing qualitatively the same metals have also been varied to provide progressively increasing, or decreasing, catalytic metals distributions. For example, reference is made to application Ser. No. 082,805, supra, which discloses a process wherein the ratio and proportion of rhenium relative to platinum is modified on the catalysts dispersed between the several reactors of a series to provide admirably high stability credits and higher conversions of the product to $C_5+$ liquid naphthas. In accordance with the process, a series of reactors, each contains a bed, or beds, of a platinum-rhenium catalyst. The catalysts in the lead reactors are constituted of supported platinum and may contain relatively low concentrations of rhenium, with the catalyst in the last reactor of the series being constituted of platinum and a relatively high concentration of rhenium, the amount of rhenium relative to the platinum in the last reactor being present in an atomic ratio of at least about 1.5:1 and higher, or preferably 2:1, and higher. In its preferred aspects, the lead reactors of the series are provided with platinum-rhenium catalysts wherein the atomic ratio of the rhenium:platinum ranges from about 0.1:1 to about 1:1, preferably from about 0.3:1 to about 1:1, and the last reactor of the series is provided with a platinum-rhenium catalyst wherein the atomic ratio of the rhenium:platinum ranges from about 1.5:1 to about 3:1, or preferably from about 2:1 to about 3:1.

In a reforming operation, one or a series of reactors, or a series of reaction zones, are employed. Typically, a series of reactors are employed, e.g., three or four reactors, these constituting the heart of the reforming unit. It was known, and described in the '805 application, that the amount of coke produced in an operating run increased progressively from a leading reactor to a subsequent reactor, or from the first reactor to the last reactor of the series as a consequence of the different types of reactions that predominate in the several different reactors. The sum-total of the reforming reactions, supra, occurs as a continuum between the first and last reactor of the series, i.e., as the feed enters and passes over the first fixed catalyst bed of the first reactor and exits from the last fixed catalyst bed of the last reactor of the series. The reactions which predominate between the several reactors differ dependent principally upon the nature of the feed, and the temperature employed within the individual reactors. In the initial reaction zone, or first reactor, which is maintained at a relatively low temperature, the primary reaction involves the dehydrogenation of naphthenes to produce aromatics. The isomerization of naphthenes, notably $C_5+$ and $C_6$ naphthenes, also occurs to a considerable extent. Most of the other reforming reactions also occur, but only to a lesser, or smaller extent. There is relatively little hydrocracking, and very little olefin or paraffin dehydrocyclization occurs in the first reactor. Within the intermediate reactor zone(s) or reactor(s), the temperature is maintained somewhat higher than in the first, or lead reactor of the series, and the primary reactions in the intermediate reactor, or reactors, involve the isomerization of naphthenes and paraffins. Where, e.g., there are two reactors disposed between the first and last reactor of the series, the principal reaction involves the isomerization of naphthenes, normal paraffins and isoparaffins. Some dehydrogenation of naphthenes may, and usually does occur, at least within the first of the intermediate reactors. There is usually some hydrocracking, at least more than in the lead reactor of the series, and there is more olefin and paraffin dehydrocyclization. The third reactor of the series, or second intermediate reactor, is generally operated at a somewhat higher temperature than the second reactor of the series. The naphthene and paraffin isomerization reactions continues as the primary reaction in this reactor, but there is very little naphthene dehydrogenation. There is a further increase in paraffin dehydrocyclization, and more hydrocracking. In the final reaction zone, or final reactor, which is operated at the highest temperature of the series, paraffin dehydrocyclization, particularly the dehydrocyclization of the short chain, notably $C_6$ and $C_7$ paraffins, is the primary reaction. The isomerization reactions continue, and there is more hydrocracking in this reactor than in any of the other reactors of the series.

It was also generally known that the increased levels of coke in the several reactors of the series caused considerable deactivation of the catalysts. Whereas the relationship between coke formation, and rhenium promotion to increase catalyst selectivity was not, and is not known with any degree of certainty because of the extreme complexity of these reactions, it was, and is believed that the presence of the rhenium minimizes the adverse consequences of the increased coke levels, albeit it does not appear to minimize coke formation in any absolute sense. Accordingly, in the invention described by the '805 application, supra, the concentration of the rhenium was progressively increased in those reactors where coke formation is the greatest, but most particularly in the last reactor of the series to counteract the normal effects of coking.

Subsequent, it was found and disclosed in our parent application Ser. No. 336,495, supra, that yet higher activity and yield credits could be obtained by the more extensive use of a high rhenium, rhenium promoted platinum catalyst. In such process, the high rhenium, rhenium promoted platinum catalyst constituted at least one-half, and preferably constituted from about 50 percent to about 90 percent, of the total catalyst charged to the several reactors of a reforming unit, the catalyst being concentrated within at least the final reactors, or reaction zones, of the series, whereas at least about 10 percent of the forwardmost reactor volume contained a platinum, or low rhenium platinum-rhenium, catalyst; this being the reaction zone wherein naphthene dehydrogenation is the principal reaction. Higher activity and $C_5+$ liquid yields are obtained than is obtained when using catalyst systems where the high rhenium catalyst constitutes less than fifty percent of total catalyst charge as disclosed in the '805 application, supra.

These variations, and modifications have generally resulted in improving the basic process with respect to increased process stability, and increased $C_5+$ liquid yields.

It is, nonetheless, an objective of this invention to provide a further improved process, particularly a process capable of achieving yet further improved catalyst stability, activity, and higher conversions of feed naphthas to $C_5+$ liquids, especially at high severities, as contrasted with prior art processes.

These objects and others are achieved in accordance with the present invention embodying improvements in a process of operating a semi-regenerative or semi-cyclic reforming unit, wherein at least about 30 percent, and preferably at least about 40 percent of the total weight of catalyst charge to the reactors is a high rhenium, platinum rhenium catalyst concentrated within the most rearward reactors (or reaction zones) of the series, or in all of the reactors (reaction zones) of the series; a high rhenium platinum catalyst in accordance with this invention being one wherein the rhenium is present relative to the platinum in weight concentration of at least about 1.5:1, and preferably from about 2:1, and higher. The catalyst bed, or beds, of the forwardmost reactor (reaction zone) of the series can contain, and preferably contains a platinum catalyst, or a low rhenium, rhenium promoted platinum catalyst, or catalyst which contains rhenium in concentration providing a weight ratio of rhenium:platinum of up to about 1.2:1, and preferably up to about 1:1. In accordance with this invention, all of the several reactors (or reaction zones) of the unit are operated at temperatures ranging from about 850° F. to about 950° F. (Equivalent Isothermal Temperature, E.I.T.), preferably from about 900° F. to about 930° F. E.I.T., at pressures ranging from about 150 psig to about 350 psig, preferably from about 175 psig to about 275 psig, while the gas rate is maintained at from about 2500 to about 4500 SCF/B, preferably from about 3000 to about 4000 SCF/B. Optimum yield credits for the staged rhenium system of this invention, it is found, are obtained by operating at severities which will provide a run length of at least 700 hours, and preferably a cycle length ranging from about 700 hours to about 2750 hours. Yield credits for the staged rhenium system of this invention are smaller at severities which result in cycle lengths less than about 700 hours or more than about 2750 hours.

The present invention requires the use of a high rhenium, platinum-rhenium catalyst within the reforming zone wherein the primary, or predominant reactions involves the dehydrocyclization of paraffins and olefins. Preferably, it also includes the use of a high rhenium, platinum-rhenium catalyst in the zone, or zones wherein the primary, or predominant reactors involves the isomerization of naphthenes, normal paraffins and isoparaffins. A high rhenium, platinum-rhenium catalyst can also be employed in the zone wherein naphthene dehydrogenation is the primary, or predominant reaction. Within the paraffin dehydrocyclization zone, and more preferably with both the paraffin dehydrocyclization and isomerization zones, there is employed a platinum-rhenium catalyst which contains rhenium in concentration sufficient to provide a weight ratio of rhenium-platinum of at least about 1.5:1, and higher, preferably at least about 2:1, and higher, and more preferably from about 2:1 to about 3:1. The naphthene dehydrogenation zone constitutes the lead zone of the series. The zone, or zones wherein the isomerization reactions predominate follows the zone wherein naphthene dehydrogenation is the primary, or dominant reaction. The naphthene dehydrogenation zone is found in the first reactor where a series of reactors constitutes the reforming unit. The isomerization zone, or zones, where a series of reactors constitute the reforming unit, may be found at the exit side of the first or lead reactor, and generally in the intermediate reactor, or reactors, of the series, or both. The paraffin dehydrocyclization zone, where a series of reactors constitute the reforming unit, is found in the last reactor, or final reactor of the series. Of course, where there is only a single reactor, quite obviously the isomerization reactions will predominate in the bed, or beds, defining the zone following that wherein naphthene dehydrogenation is the primary reaction. The paraffin dehydrocyclization reaction will predominate in the catalyst bed, or beds, defining the next zone downstream of the isomerization zone, or zone located at the product exit side of the reactor. Where there are multiple reactors, quite obviously the paraffin dehydrocyclization reaction will predominate in the catalyst bed, or beds defining a zone located at the product exit side of the last reactor of the series. Often the paraffin dehydrocyclization reaction is predominant of the sum-total of the reactions which occur within the catalyst bed, or beds constituting the last reactor of the series dependent upon the temperature and amount of catalyst that is employed in the final reactor vis-a-vis the total catalyst contained in the several reactors, and temperatures maintained in the other reactors of the reforming unit.

In its preferred aspects, the forwardmost reactor (reaction zone) of the reforming unit can contain up to about 20 weight percent, and preferably at least about 10 weight percent, of an unpromoted platinum catalyst, or a low rhenium, rhenium promoted platinum catalyst, with the remainder of the catalyst of the unit being constituted of a high rhenium, rhenium promoted platinum catalyst. Conversely, the rearwardmost reactor, or reactors, of the reforming unit will contain at least 30 percent, preferably from about 40 percent of about 90 percent of the total weight of catalyst charge in the reactors, as a high rhenium, rhenium promoted platinum catalyst. It has been found, with such loadings of high rhenium, platinum rhenium catalysts, that catalyst stability, catalyst activity, and $C_5+$ liquid yield are a function of operating conditions, especially as relates to reactor pressure and recycle gas rate. These operating conditions with such catalyst loadings will provide, over the total length of an operating run, maximum catalyst stability, catalyst activity and $C_5+$ liquid yield at good product octane levels.

It was found by Swan and Oyekan, supra, that staging rhenium promoted platinum catalysts in the several reactors of a reforming unit based on rhenium concentration, particularly the placement of high rhenium, rhenium promoted platinum catalysts in the final reactor of a series, which represents a maximum of 30 to 40 percent concentration of the high rhenium, platinum rhenium catalyst within the total reactor space, provided increased catalyst activity and yield credits relative to the use of the more conventional rhenium stabilized platinum catalyst in the several reactors of the unit. Then, quite surprisingly, we found and disclosed in our copending application Ser. No. 336,495, supra, that yet considerably higher catalyst activity and yield credits could be obtained by the more extensive use, in a moderately severe semi-regenerative or semi-cyclic reforming operation, of a high rhenium, rhenium promoted platinum catalyst, i.e., one wherein the high rhenium, rhenium promoted platinum catalyst constituted at least one-half, and preferably from about 50 percent to about 90 percent, of the total catalyst charged to the several reactors of a reforming unit, said catalyst being concentrated within at least the final reactors, or reaction zones, of the series. It was found, e.g., that the yield credit was increased from about 0.5 to 1 liquid volume percent (LV%) to about 2 to 3 LV% in a moderate severity semi-regenerative reforming operation, as contrasted with a similar operation at higher severity such as is typical in cyclic operations. Thus, the use of a high rhenium, rhenium promoted platinum catalyst in the final reactor of a series of reactors as employed in a cyclic reforming operation by Swan and Oyekan provided yield credits of at least about 0.5 to +1 LV%, as contrasted with conventional operations which utilized platinum-rhenium catalysts having a rhenium:platinum of up to about 1:1 in all of the reactors of a unit. Then, as disclosed in our '495 application, we found that yields in semi-regenerative operations could be further significantly improved by charging at least fifty percent of the total reactor space with high rhenium, rhenium promoted platinum catalyst. Now, we have found that these yield advantages can be further increased. Catalyst stability, catalyst activity, and $C_5+$ liquid yield credits for staged rhenium systems in moderately severe semi-regen or semi-cyclic conditions are quite surprisingly much higher, i.e., 2-3 LV%, than in either lower severity semi-regen or higher severity cyclic conditions. Albeit the reasons for these advantages are not understood, certain observations and conclusions can be made.

Rhenium reduces the adverse affects of coke on the catalyst particularly, it is believed, as relates to the use of high concentrations of rhenium relative to the platinum hydrogenation-dehydrogenation component. The rate of coke build-up on the catalyst increases with increasing temperature, reduced hydrogen pressure, and increased oil partial pressure. Conversely, the rate of coke build-up, or catalyst deactivation, is slowest at high pressure semi-regenerative conditions, high pressure/high recycle gas rates, and low temperatures. The rate of coke build-up therefore is most rapid at cyclic reforming conditions which requires low pressures, low gas rates and high temperatures. Intermediate severity "semi-cyclic" operations typically combine the low pressures and gas rates of cyclic operations with the lower temperatures of semi-regen operations and hence the coke effect in semi-cyclic operations is intermediate those of semi-regenerative and cyclic operations. It is thus postuated in accordance with this invention that the nature of coke and its affect on catalyst selectivity is affected by process conditions. Yield credits for the high rhenium, platinum rhenium catalysts at intermediate severities ("semi-cyclic" or low pressure semi-regenerative conditions) are higher than those credits obtained with the same catalysts at low severity semi-regenerative conditions because increased coking rates occur at semi-cyclic conditions. However, as severity is increased further as in moving from semi-cyclic to cyclic conditions, coke properties change in such a way that the yield credits for high-rhenium catalysts are reduced.

It was exemplified in application Ser. No. 082,805, supra, that yield and activity credits could be obtained by charging the final reactor of a multi reactor reforming unit with a high rhenium, rhenium promoted platinum catalyst, and the lead and intermediate reactors with a more conventional platinum-rhenium catalyst wherein the rhenium:platinum ratio of the catalyst approximated 1:1. These credits were demonstrated at relatively low pressure cyclic conditions (175 psig, 3000 SCF/B, 950° F. E.I.T., relatively high pressure semi-regenerative conditions (400 psig, 6000 SCF/B, around 900° F. start-of-run (SOR) temperature) and relatively high pressure "semi-cyclic" conditions (425 psig, 2500 SCF/B, approximately 900° F. SOR temperature ). In each case these credits were about +0.5 to +1 LV% $C_5+$ liquid yield and +5 to 15% initial activity for staged systems comprising 30-40% of a high rhenium, platinum rhenium catalyst in the final reactor of the series, as contrasted with a conventional operation. It was then exemplified in application Ser. No. 336,495, supra, that yield credits could then be further improved, i.e., by an additional 0.5 to 1 LV% $C_5+$ liquid yield, with further increased catalyst activity in operations wherein the concentration of high rhenium, platinum rhenium catalyst were further increased to 50 percent, or 50 percent to 90 percent based on the total catalyst charged to the reforming unit. Now, it has been found that these credits can be further increased, in fact essentially doubled over those presented in the '805 application by operation at low pressure, semiregenerate or semi-cyclic conditions, while retaining the high concentration of high rhenium, platinum rhenium catalysts within the rearwardmost reactors of the unit.

The following data, by way of comparison, was presented in the '805 application. All parts are in terms of weight units except as otherwise specified. These data are demonstrative of the activity and yield advantages obtained at high severity cyclic conditions by the use of a high rhenium platinum-rhenium catalyst in the tail reactor of a multiple reactor unit reformer, with a low rhenium, platinum-rhenium catalyst in the several lead reactors, to wit:

DEMONSTRATIONS (I)

A series of platinum-rhenium catalysts of high rhenium content were prepared for demonstrative purposes from portions of particulate alumina of the type conventionally used in the manufacture of commercial reforming catalysts. These portions of alumina, i.e., 1/16 inch diameter extrudates, were calcined for 3 hours at 1000° F. followed by equilibration with water vapor for 16 hours. Impregnation of metals upon the supports in each instance was achieved by adding $H_2PtCl_6$, $HReO_4$, and HCl in aqueous solution, while carbon dioxide was added as an impregnation aid. After a two hour equilibration, a mixture was dried, and then placed in a vacuum oven at 150° C. for a 16 hour period.

Prior to naphtha reforming, the catalyst was heated to 950° F. in 6% $O_2$ (94% $N_2$), and then soaked in $Cl_2/O_2$ (500 ppm $Cl_2$, 6% $O_2$, 5000 ppm $H_2$) for one hour. Following 3 hours in 6% $O_2$ at 950° F., the catalyst was cooled to 850° F., reduced with 1.5% $H_2$ in $N_2$, and then presulfided with $H_2S$ in this reducing gas to achieve the desired catalyst sulfur level.

A low rhenium, rhenium promoted platinum catalyst was employed in the forward reactor, or reactors of a unit. This catalyst, which contained rhenium:platinum in weight ratio of 1:1, was obtained already made from a catalyst manufacturer. However, this catalyst was made, and prepared in similar manner with the high rhenium, rhenium promoted platinum catalysts.

Inspections on the feed employed in the tests (Feedstocks A and B) are given in Table I.

TABLE I

|  | Feedstock A Lt. Arabina Virgin Naphtha | Feedstock B Persian Gulf Paraffinic Naphtha | Feedstock C Arabian Virgin Light Paraffinic Naphtha |
|---|---|---|---|
| API Gravity | 59.7 | 58.9 | 59.7 |
| Sulfur, wppm | 0.5 | 0.5 | 0.5 |
| Nitrogen, wppm | 0.1 | 0.1 | 0.1 |
| ASTMD Distillation |  |  |  |
| IBP °F. | 180 | 166 | 181 |
| 5% | 213 | 203 | 196 |
| 10 | 219 | 214 | 204 |
| 20 | 232 | 227 | 211 |
| 30 | 242 | 239 | 218 |
| 40 | 255 | 253 | 229 |
| 50 | 267 | 269 | 241 |
| 60 | 278 | 283 | 253 |
| 70 | 294 | 299 | 269 |
| 80 | 308 | 315 | 287 |
| 90 | 324 | 333 | 310 |
| 95 | 336 | 346 | 328 |
| FBP | 382 | 358 | 350 |

In a first cyclic simulation reforming run (Run 1), at high severity cyclic conditions, a high rhenium, platinum-rhenium catalyst containing 0.3% Pt/0.67% Re/1.1% $Cl_2$/0.15% S was used in all of the several reactors of a four reactor unit, and it was prepared as previously described. In a second run (Run 2) all of the reactors of the series were provided with low rhenium catalysts containing 0.3% Pt/0.3% Re/1.1% $Cl_2$/0.15% S. The runs were conducted by passing the Light Arabian paraffinic naphtha through the series of reactors at 950° F. E.I.T., 175 psig, 3000 SCF/B which are the conditions necessary to produce a 102.0 RONC product. The results of these runs are given in Table II.

A third run (Run 3) was conducted under similar conditions with the same feed except that the three lead reactors were charged with the low rhenium catalysts, and the tail reactor only was charged with the high rhenium catalyst (28 wt. % of the total catalyst charge). The results are given in Table II.

In a fourth run (Run 4), a dry, calcined catalyst containing 0.29% Pt/0.72% Re/1.1% $Cl_2$/0.14% S was charged to the fourth, or tail reactor of a unit, and the first three reactors were charged with the low rhenium catalyst. This run was conducted with a more difficult to reform Persian Gulf Paraffinic naphtha at 950° F. E.I.T., 175 psig, 3000 SCF/B, at space velocity sufficient to produce a 100 RON product.

A fifth run (Run 5) conducted at identical conditions to those used in Run 4, but with low rhenium catalyst in all four of the reactors. This run, which should be compared with Run 4 is also given in Table II.

A series of additional run, i.e., Runs 6, 7, and 8, were made in a four reactor reforming unit, certain lead reactors, or reaction zones, being charged with the low rhenium, platinum rhenium catalyst (rhenium:platinum, 1:1) with certain of the rearwardmost reactors being charged with the high rhenium, platinum rhenium catalyst (rhenium:platinum, 2:1), reference being made to Table II which describes the percentages of each catalyst used in these runs. Feedstock C, as defined in Table I, was reformed at identical conditions to those used in Runs 4 and 5 at a space velocity sufficient to produce a 99 RON product. The results are given in Table II.

TABLE II

| Run No. | Catalyst | Feedstock | Catalyst Activity Units | Yield $C_5$+LV % |
|---|---|---|---|---|
| 1 | 100% High Re | A | 96 | 69.3 |
| 2 | 100 Low Re | A | 102 | 72.0 |
| 3 | 72% Low Re, 28% High Re | A | 102 | 72.5 |
| 4 | 72% Low Re, 28% High Re | B | 92 | 75.5 |
| 5 | 100% Low Re | B | 77 | 74.3 |
| 6 | 100% Low Re | C | 83 | 77.7 |
| 7 | 72% Low Re, 28% High Re | C | 101 | 77.7 |
| 8 | 44% Low Re, 56% High Re | C | 98 | 77.2 |

These data show, by comparison of Runs 1 and 2, that the use of a high rhenium, platinum rhenium catalyst produces lower catalyst activity and lower $C_5$+ liquid yields at similar high severity cyclic conditions than the use of a low rhenium, platinum rhenium catalyst in all of the reactors of the unit.

A comparison of Run 2 with Run 3, and Run 4 with Run 5, show catalyst activity and $C_5$+ liquid yield credits of at least 0.5 LV% for catalyst systems containing high rhenium, platinum rhenium catalysts in the rearwardmost reactors, or reaction zones, with low rhenium platinum rhenium catalysts in the forwardmost reactors, or reaction zones, as contrasted with runs made with all of the reactors containing a low rhenium, platinum rhenium catalyst. A comparison of Run 7 with Run 8 shows a 0.5 LV% $C_5$+ liquid yield credit, and catalyst activity credit, at the high severity cyclic conditions in the use of a reactor unit containing a 28 weight percent charge of the high rhenium, platinum rhenium catalyst in the rearwardmost reactors of the unit vis-a-vis a reactor unit containing a 56 weight percent charge of the high rhenium, platinum rhenium catalyst in the rearwardmost reactors of the unit.

A comparison of Run 8 with Run 6 shows a higher catalyst activity but lower $C_5$+ liquid yields at the severe cyclic conditions for a reforming unit containing 56 percent of the high rhenium, platinum rhenium catalyst in the rearwardmost reactors of the unit vis-a-vis a unit wherein all of the reactors of the unit are charged with a low rhenium, platinum rhenium catalyst.

The following data, for purposes of comparison, was presented in our '495 application, supra. All units are in terms of weight except as otherwise specified. These data are demonstrative of the activity and $C_5$+ liquid yield advantages achieved by concentrating within the rearwardmost reaction zone at least about 40 percent, preferably from about 40 percent to about 90 percent, based on the total weight of catalyst in said reforming unit, of a high rhenium, rhenium platinum catalyst, while concentrating within the lead reaction zone, or reaction zone which does not contain a high rhenium, platinum rhenium catalyst, a platinum catalyst or rhenium promoted platinum catalyst which contains a weight ratio of rhenium:platinum of 1:1, or less.

DEMONSTRATIONS (II)

In accordance with this demonstration, Run 9, a light Arabian Virgin paraffinic naphtha (Feedstock C), the inspections of which are given in Table I, was reformed in a one reactor pilot plant unit in a first run with once-through pure hydrogen wherein the first 33⅓ percent of the reactor was charged with a rhenium promoted platinum-rhenium catalyst containing rhenium:platinum in a 1:1 weight ratio, and the last, or exit side of the reactor was charged with 66⅔ percent of a rhenium promoted, platinum-rhenium catalyst containing rhenium:platinum in an approximately 2:1 weight ratio. In other words, the forward portion of the reacton zone contained 33⅓ percent of the total catalyst charge to the unit as a conventional platinum-rhenium catalyst, and the rearwardmost portion of the reaction zone contained 66⅔ percent of the total catalyst charge to the unit as a high rhenium, rhenium promoted platinum catalyst.

For purposes of comparison, another run, Run 10, was made wherein Feedstock C was reformed in a one reactor unit at similar conditions over similar catalysts except that in this instance the lead portion of the reactor was packed with two-thirds by weight of the low rhenium, platinum-rhenium catalyst and the rearward portion of the reactor with one-third by weight of the high rhenium, platinum-rhenium catalyst.

For further comparison, in Run 11 the entire reactor was 100 percent charged with the low rhenium, platinum-rhenium catalyst and Feedstock C again reformed thereover at similar conditions. No high rhenium, platinum-rhenium catalyst was used in this run.

In conducting each of Runs 9, 10, and 11, supra, the reactions were each initially conducted by contacting the catalysts with the oil at 268 psig, 3300 SCF/B, 905° F. temperature (which, in a commercial unit which uses 66% pure recycle hydrogen, is equivalent to 375 psig, 5000 SCF/B, and 905° F.). After about 2650 hours on oil, unit conditions were shifted from 268 psig, 3300 SCF/B once-through H₂ to 173 psig, 2100 SCF/B once-through H₂, this shift accelerating the deactivation rates. (These conditions simulate commercial unit conditions of 375 psig, 5000 SCF/B recycle gas and 225 psig, 3000 SCF/B recycle gas respectively.) After 2980 hours on oil, the conditions were shifted back to 268 psig, 3300 SCF/Bbl, 905° F.

The results of these runs are given in Table III. The relative activities and C₅³⁰ liquid yields for each run are given for before pressure reduction and after pressure reduction.

TABLE III

| Catalyst | Before Pressure Reduction 268 psig; 3300 SCF/B; 905° F. | | After Pressure Reduction 268 psig; 3300 SCF/B; 905° F. | |
|---|---|---|---|---|
| | Activity | LV % C₅+ | Activity | LV % C₅+ |
| (a) 33⅓ Low Re, Pt—Re/66⅔% High Re, Pt—Re | 58 | 70.7 | 35 | 68.7 |
| (b) 66⅔ Low Re, Pt—Re/33⅓% High Re, Pt—Re | 48 | 70.9 | 30 | 67.9 |

TABLE III-continued

| Catalyst | Before Pressure Reduction 268 psig; 3300 SCF/B; 905° F. | | After Pressure Reduction 268 psig; 3300 SCF/B; 905° F. | |
|---|---|---|---|---|
| | Activity | LV % C₅+ | Activity | LV % C₅+ |
| (c) 100% Low Re, Pt—Re | 41 | 70.1 | 20 | 66.5 |

The advantages demonstrate gains made in the activity and C₅+ liquid volume yield in the use of a high rhenium, platinum-rhenium catalyst loaded into more than forty percent of the total rearward reactor volume, with low rhenium, platinum-rhenium catalyst loaded into the forward reactor volume. It is thus clearly demonstrated that the catalyst system with 66⅔% high rhenium, platinum-rhenium catalyst had equivalent yields and higher activity than the system with 33⅓% high rhenium, platinum-rhenium catalyst. After the pressure reduction the run with 66⅔% high rhenium, platinum-rhenium catalyst unquestionably showed better yields than the system with the 33⅓% high rhenium, platinum-rhenium catalyst; and, of course, better activity and yields than the system wherein no high rhenium, platinum-rhenium catalyst was used. These results clearly indicate that the use of 40% and greater total high rhenium, platinum-rhenium catalyst charges contained in the rearwardmost portion of the total reactor space are preferred over similar runs with, e.g., 30 to 40% high rhenium, platinum-rhenium catalyst charges occupying this same reactor space.

The present invention will be more fully understood, and appreciated by reference to the foregoing demonstrations and the following examplary data. All units are given in terms of weight except as otherwise specified.

EXAMPLES

Reference is made to the foregoing Demonstrations-(II) wherein the catalyst activity and C₅+ liquid volume percent yield are contrasted, with the same feed and catalyst loadings at the same conditions (i.e., 268 psig; 3300 SCF/B; 950° F.) except for passage of time. These same data are presented in Table IV, and contrasted with the even larger gains made in catalyst activity and C₅+ liquid volume percent yield at higher severity conditions at the actual time of pressure reduction, or period wherein the run conditions were changed from 268 psig, 3300 SCF/B once-through H₂, 905° F. to 173 psig, 2100 SCF/B once-through H₂, 905° F., this period being referred to in Table IV as "During Pressure Reduction." For convenience, the run numbers are still referred to as Runs 9, 10, and 11, respectively; the only distinction between the data given in Table IV and Table III being that the results obtained "During Pressure Reduction" are given, and contrasted with the results obtained before pressure reduction and after pressure reduction.

TABLE IV

| Run No. | Catalyst | Before Pressure Reduction 268 psig; 3300 SCF/B; 905° F. | | During Pressure Reduction 173 psig; 2100 SCF/B; 905° F. | | After Pressure Reduction 268 psig; 3300 SCF/B; 905° F. | |
|---|---|---|---|---|---|---|---|
| | | Act. | $C_5^+$ LV % | Act. | $C_5^+$ LV % | Act. | $C_5^+$ LV % |
| 9 | 33⅓ Low Re, Pt—Re/ 66⅔% High Re, Pt—Re | 58 | 70.7 | 44 | 73.7 | 35 | 68.7 |
| 10 | 66⅔ Low Re, Pt—Re/ 33⅓% High Re, Pt—Re | 48 | 70.9 | 33 | 73.6 | 30 | 67.9 |
| 11 | 100% Low Re, Pt—Re | 41 | 70.1 | 31 | 70.5 | 20 | 66.5 |

These data clearly show considerably improved $C_5^+$ liquid yield credits for the low pressure runs made with the high rhenium staged catalyst systems, the highest $C_5^+$ liquid yield credit advantage being obtained in Run 9 wherein a full 3 LV% $C_5^+$ liquid volume percent yield advantage was obtained with 66⅔% of high rhenium catalyst staging vis-a-vis Run 10 wherein a 2.7 LV% $C_5^+$ liquid volume percent yield advantage was obtained (73.6 $C_5^+$ LV% vs 70.9 $C_5^+$ LV%) with 33⅓% high rhenium catalyst staging. With all of the reactors of the unit packed with low rhenium, platinum rhenium catalyst only a small $C_5^+$ liquid yield advantage was obtained, i.e., 70.5 $C_5^+$ LV% vs. 70.1 $C_5^+$ LV%. The $C_5^+$ liquid volume percent yield credits are also apparent even when the results are compared with after reduction. The fact that $C_5^+$ liquid volume percent yield credits were reduced after the return to high pressure conditions indicates more than coke buildup was involved. The reasons are not understood, but it is apparent that staged rhenium catalyst systems operate best (relative to all low Re catalyst) at a combination of $H_2$ and oil pressures, and temperature, at low recycle/pressure conditions.

Additional Runs 12, 13, 14, and 15 using the feed, equipment, and catalysts described by reference to Runs 9, 10, and 11 were conducted at a start of run temperature of 895° F. at once-through $H_2$ conditions of 146 psig, 2400 SCF $H_2$/Bbl (equivalent to 175 psig, 3000 SCF recycle gas/Bbl in a recycle unit). The mid-run catalyst performance at these moderately severe, semi-cyclic conditions for these runs is given in Table V.

TABLE V

Mid-Run Catalyst Performance at Moderately Severe Semi-Cyclic Conditions

| Run No. | Catalyst | Activity | Yield $C_5^+$ LV % |
|---|---|---|---|
| 12 | 100% Low Rhenium | 31 | 73.8 |
| 13 | 66⅔ Low Rhenium 33⅓% High Rhenium | 36 | 75.0 |
| 14 | 33⅓% Low Rhenium 66⅔% High Rhenium | 40 | 75.8 |
| 15 | 100% High Rhenium | 47 | 77.0 |

These results confirm the larger yield credits seen at lower pressure/recycle rate semi-cyclic conditions (Table IV). Credits are higher than credits obtained with Feedstock C in Runs 5, 7, and 8 (very severe cyclic conditions) or those obtained at high pressure/gas rate semiregenerative conditions.

The catalyst employed in accordance with this invention is necessarily constituted of composite particles which contain, besides a carrier or support material, a hydrogenation-dehydrogenation component, or components, a halide component and, preferably, the catalyst is sulfided. The support material is constituted of a porous, refractory inorganic oxide, particularly alumina. The support can contain, e.g., one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m²/g, preferably from about 100 to about 300 m²/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The metal hydrogenation-dehydrogenation component can be composited with or otherwise intimately associated with the porous inorganic oxide support or carrier by various techniques known to the art such as ion exchange, coprecipitation with the alumina in the sol or gel form, and the like. For example, the catalyst composite can be formed by adding together suitable reagents such as a salt of platinum and ammonium hydroxide or carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or other non-agglomerating atmosphere. The metal hydrogenation components can also be added to the catalyst by impregnation, typically via an "incipient wetness" technique which requires a minimum of solution so that the total solution is absorbed, initially or after some evaporation.

It is preferred to deposit the platinum and rhenium metals, and additional metals used as promoters, if any, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

Platinum in absolute amount, is usually supported on the carrier within the range of from about 0.01 to 3 percent, preferably from about 0.05 to 1 percent, based on the weight of the catalyst (dry basis). Rhenium, in absolute amount, is also usually supported on the carrier in concentration ranging from about 0.1 to about 3 percent, preferably from about 0.5 to about 1 percent, based on the weight of the catalyst (dry basis). The absolute concentration of each, of course, is preselected to provide the desired weight ratio of rhenium:platinum for a respective reactor of the unit, as heretofore expressed. For example, where rhenium is employed in concentration of 3 weight percent, based on total weight of catalyst, and it is desired to provide rhenium:platinum in weight ratio of 1:1 then the catalyst will contain 3 parts by weight rhenium and 3 parts by weight platinum. When, e.g., a weight ratio of rhenium:platinum of 1.5:1 is desired, and the platinum is employed in concentration of 3 parts by weight, based on the total weight of catalyst, then the catalyst will contain 4.5 parts by weight rhenium. In general, no more than about 3 weight percent platinum is put on a catalyst, with adequate rhenium to provide the desired ratio of rhenium:platinum. For most commercial applications, no more than about 1 weight percent platinum is put on a catalyst, with adequate rhenium to provide the desired ratio of rhenium:platinum. For example, where it is desired to provide a weight ratio of rhenium:platinum of 3:1 and 1 part by weight platinum is employed on the catalyst, then 3 parts by weight rhenium are added to the catalyst.

In the catalyst of the rearward most reactors, the rhenium is provided in major amount relative to the platinum whereas, in contrast, in the forward reactors the rhenium is provided in smaller amount, or no more than about an equal amount, relative to the platinum, based on the weight of these metals, one with respect to the other. In compositing the metals with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where, e.g., platinum is to be deposited on the carrier, platinum chloride, platinum nitrate, chloroplatinic acid, ammonium chloroplatinate, potassium chloroplatinate, platinum polyamine, platinum acetylacetonate, and the like, are preferably used. A promoter metal, or metal other than platinum and rhenium, when employed, is added in concentration ranging from about 0.01 to 3 percent, preferably from about 0.05 to about 1 percent, based on the weight of the catalyst.

In preparing catalysts, the metals are deposited from solution on the carrier in preselected amounts to provide the desired absolute amount, and weight ratio of each respective metal. Albeit the solution, or solutions, may be prepared to nominally contain the required amounts of metals with a high degree of precision, as is well known, chemical analysis will show that the finally prepared catalyst, or catalyst charged into a reactor, will generally deviate negatively or positively with respect to the preselected nominal values. In general, however, where, e.g., the final catalyst is to contain 0.3 wt. % platinum and 0.7 wt. % rhenium the preparation can be controlled to provide within a 95% confidence level a range of ±0.03 wt. % platinum and ±0.05 wt. % rhenium. Or where, e.g., the final catalyst is to contain 0.3 wt. % platinum and 0.3 weight percent rhenium, the preparation can be controlled to provide within a 95% confidence level a range ±0.03 wt. % platinum and ±0.03 wt. % rhenium. Thus, a catalyst nominally containing 0.3 wt. % platinum and 0.7 wt. % rhenium is for practical purposes the equivalent of one which contains 0.3±0.03 wt. % platinum and 0.7±0.05 wt. % rhenium, and one which contains 0.3±0.03 wt. % platinum and 0.3±0.05 wt. % rhenium, respectively.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 1 to 1.5 percent, based on the weight of the catalyst. When using chlorine as a halogen component, it is added to the catalyst within the range of about 0.1 to 2 percent, preferably within the range of about 1 to 1.5 percent, based on the weight of the catalyst. The introduction of halogen into catalyst can be carried out by any method at any time. It can be added to the catalyst during catalyst preparation, for example, prior to, following, or simultaneously with the incorporation of the metal hydrogenation-dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F., in the presence of nitrogen or oxygen, or both, in an air stream or under vacuum. The catalyst is calcined at a temperature between about 400° F. to 1200° F., preferably about 500° F. to 1000° F., either in the presence of oxygen in an air stream or in the presence of an inert gas such as nitrogen.

Sulfur is a highly preferred component of the catalysts, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and at pressures ranging from about 1 to about 40 atmospheres for the time necessary to achieve breakthrough, or the desired sulfur level.

The feed or charge stock can be a virgin naphtha, cracked naphtha, a naphtha from a coal liquefaction process, a Fischer-Tropsch naphtha, or the like. Such feeds can contain sulfur or nitrogen, or both, at fairly high levels. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 15 to about 80 vol. % paraffins, both normal and branched, which fall in the range of about $C_5$ to $C_{12}$, from about 10 to 80 vol. % of naphthenes falling within the range of from about $C_6$ to $C_{12}$, and from 5 through 20 vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 150–350 | 175–275 |
| Reactor Temp., °F. | 850–950 | 900–930 |
| Recycle Gas Rate, SCF/B | 2500–4500 | 3000–4000 |
| Feed Rate, W/Hr/W | 0.5–3 | 0.5–3 |

It is apparent that various modifications and changes can be made without departing from the spirit and scope of the present invention.

Having described the invention, what is claimed is:

1. In a process for reforming, with hydrogen, a naphtha feed in a reforming unit which contains a plurality of catalyst-containing on stream reactors connected in series, the most rearward reactors of the series containing at least about 30 percent, based on the total weight of catalyst in all of the reactors of the unit, of a rhenium promoted platinum catalyst, the weight ratio of rhenium:platinum of which is at least about 1.5:1, the hydrogen and naphtha being heated and flowed from one reactor to another to contact the catalyst contained therein at reforming conditions, the reaction being continued over a period of at least about 700 hours, the catalyst gradually becoming less active due to coke deposition thereupon, and wherein the loss of activity caused by the coke deposition is compensated for during this period by gradually increasing the temperature of the hydrogen and naphtha feed to the reactors, the improvement comprising conducting the reaction at temperatures ranging from about 850° F. to about 950° F. (E.I.T.), at pressures ranging from about 150 psig to about 350 psig, and at gas rates ranging from about 2500 SCF/B to about 4500 SCF/B.

2. The process of claim 1 wherein the weight ratio of rhenium:platinum in the rhenium promoted platinum catalyst is at least about 2:1.

3. The process of claim 1 wherein the catalyst bed, or beds, of the most forward reactors of the series is provided with a platinum catalyst, or rhenium promoted platinum catalyst which contains rhenium in concentration providing a weight ratio of rhenium:platinum of up to about 1.2:1.

4. In a process for reforming, with hydrogen, a naphtha feed in a reforming unit which contains a plurality of catalyst-containing on-stream reactors connected in series, the most rearward reactors of the series containing from about 40 percent to about 90 percent, based on the total weight of catalyst in all of the reactors of the unit, of a rhenium promoted platinum catalyst, the weight ratio of rhenium:platinum being at least about 1.5:1, the hydrogen and naphtha being heated and flowed from one reactor to another to contact the catalyst contained therein at reforming conditions, the reaction being continued over a period of at least about 700 hours, the catalyst gradually becoming less active due to coke deposition thereupon, and wherein the loss of activity caused by the coke deposition is compensated for during this period by gradually increasing the temperature of the hydrogen and naphtha feed to the reactors, the improvement comprising, conducting the reaction at temperatures ranging from about 850° F. to about 950° F. (E.I.T.), at pressures ranging from about 150 psig to about 350 psig, and at gas rates ranging from about 2500 SCF/B to about 4500 SCF/B.

5. The process of claim 4 wherein the weight ratio of rhenium:platinum in the rhenium promoted platinum catalyst is at least about 2:1.

6. The process of claim 4 wherein the catalyst bed, or beds, of the most forward reactors of the series is provided with a platinum catalyst, or rhenium promoted platinum catalyst which contains rhenium in concentration providing a weight ratio of rhenium:platinum of up to about 1.2:1.

7. The process of claim 4 wherein the weight ratio of rhenium:platinum in the catalyst of the tail reactor ranges from about 2:1 to about 3:1.

8. The process of claim 4 wherein the high rhenium, rhenium promoted platinum catalyst charged into the reactors contains from about 0.01 to about 3 weight percent platinum.

9. The process of claim 4 wherein the high rhenium, rhenium promoted platinum catalyst charged into the reactors contains from about 0.1 to about 3 weight percent rhenium.

10. The process of claim 4 wherein the high rhenium, rhenium promoted platinum catalyst charged into the reactors contains from about 0.05 to about 1 weight percent platinum.

11. The process of claim 4 wherein the high rhenium, rhenium promoted platinum catalyst charged into the reactors contains from about 0.5 to about 1 weight percent rhenium.

12. The process of claim 4 wherein the high rhenium, rhenium promoted platinum catalyst charged into the reactors contains from about 0.01 to about 3 weight percent platinum, and sufficient rhenium to provide the expressed ratio of rhenium:platinum.

13. The process of claim 4 wherein the high rhenium, rhenium promoted platinum catalyst charged into the reactors contains from about 0.1 to about 3 weight percent rhenium, and sufficient platinum to provide the expressed ratio of rhenium:platinum.

14. The process of claim 4 wherein the high rhenium, rhenium promoted platinum catalyst charged into the reactors contains from about 0.1 to about 3 weight percent halogen.

15. The process of claim 4 wherein the high rhenium, rhenium promoted platinum catalyst charged into the reactors contains from about 1 to about 1.5 weight percent halogen.

16. The process of claim 4 wherein the high rhenium, rhenium promoted platinum catalyst charged into the reactor is sulfided, and contains to about 0.2 weight percent sulfur.

17. The process of claim 4 wherein the reactors of the unit all contain a rhenium promoted platinum catalyst, the weight ratio of rhenium:platinum being at least about 1.5:1.

18. In a process for reforming, with hydrogen, a naphtha feed in a reforming unit which contains at least one catalyst-containing on stream reactor through which the hydrogen and naphtha are heated and flowed to contact the catalyst at reforming conditions through a series of naphthene dehydrogenation, isomerization, and paraffin dehydrocyclization zones, the most rearward reaction zones of the series containing at least about 30 percent, based on the total weight of catalyst in the reforming unit, of a rhenium promoted platinum catalyst, the weight ratio of rhenium:platinum of which is at least about 1.5:1, the reaction being continued over a period of at least about 700 hours, the catalyst gradually becoming less active due to coke deposition thereupon, and wherein the loss of activity caused by the coke deposition is compensated for during this period by gradually increasing the temperature of the hydrogen and naphtha feed to the reactors, the improvement comprising conducting the reaction at temperatures ranging from about 850° F. to about 950° F. (E.I.T.), at pressures ranging from about 150 psig to about 350 psig, and at gas rates ranging from about 2500 SCF/B to about 4500 SCF/B.

19. The process of claim 18 wherein the weight ratio of rhenium:platinum in the rhenium promoted platinum catalyst is at least about 2:1.

20. The process of claim 18 wherein the catalyst bed, or beds, of the most forward reaction zone of the series is provided with a platinum catalyst, or rhenium promoted platinum catalyst which contains rhenium in concentration providing a weight ratio of rhenium:platinum of up to about 1.2:1.

21. In a process for reforming, with hydrogen, a naphtha feed in a reforming unit which contains a plurality of catalyst-containing on-stream reactors connected in series, through which the hydrogen and naphtha are heated and flowed to contact the catalyst at reforming conditions through a series of naphthene dehydrogenation, isomerization, and paraffin dehydrocyclization zones, the most rearward reaction zones of the series containing from about 40 percent to about 90 percent, based on the total weight of catalyst in all of the reactors of the unit, of a rhenium promoted platinum catalyst, the weight ratio of rhenium:platinum being at least about 1.5:1, the reaction being continued over a period of at least about 700 hours, the catalyst gradually becoming less active due to coke deposition thereupon, and wherein the loss of activity caused by the coke deposition is compensated for during this period by gradually increasing the temperature of the hydrogen and naphtha feed to the reactors, the improvement comprising, conducting the reaction at temperatures ranging from about 850° F. to about 950° F. (E.I.T.), at pressures ranging from about 150 psig to about 350 psig, and at gas rates ranging from about 2500 SCF/B to about 4500 SCF/B.

22. The process of claim 21 wherein the weight ratio of rhenium:platinum in the rhenium promoted platinum catalyst is at least about 2:1.

23. The process of claim 21 wherein the catalyst bed, or beds, of the most forward reaction zones of the series are provided with a platinum catalyst, or rhenium promoted platinum catalyst which contains rhenium in concentration providing a weight ratio of rhenium:platinum of up to about 1.2:1.

24. The process of claim 21 wherein the weight ratio of rhenium:platinum in the catalyst of the most rearward reaction zone ranges from about 2:1 to about 3:1.

25. The process of claim 21 wherein the high rhenium, rhenium promoted platinum catalyst charged into the reaction zones contains from about 0.01 to about 3 weight percent platinum.

26. The process of claim 21 wherein the high rhenium, rhenium promoted platinum catalyst charged into the reaction zones contains from about 0.1 to about 3 weight percent rhenium.

27. The process of claim 21 wherein the high rhenium, rhenium promoted platinum catalyst charged into the reaction zones contains from about 0.05 to about 1 weight percent platinum.

28. The process of claim 21 wherein the high rhenium, rhenium promoted platinum catalyst charged into the reaction zones contains from about 0.5 to about 1 weight percent rhenium.

29. The process of claim 21 wherein the high rhenium, rhenium promoted platinum catalyst charged into the reaction zones contains from about 0.01 to about 3 weight percent platinum, and sufficient rhenium to provide the expressed ratio of rhenium:platinum.

30. The process of claim 21 wherein the high rhenium, rhenium promoted platinum catalyst charged into the reaction zones contains from about 0.1 to about 3 weight percent rhenium, and sufficient platinum to provide the expressed ratio of rhenium:platinum.

31. The process of claim 21 wherein the high rhenium, rhenium promoted platinum catalyst charged into the reaction zones contains from about 0.1 to about 3 weight percent halogen.

32. The process of claim 21 wherein the high rhenium, rhenium promoted platinum catalyst charged into the reaction zones contains from about 1 to about 1.5 weight percent halogen.

33. The process of claim 21 wherein the high rhenium, rhenium promoted platinum catalyst charged into the reaction zones is sulfided, and contains to about 0.2 weight percent sulfur.

34. The process of claim 21 wherein all of the reaction zones of the unit contain a rhenium promoted platinum catalyst, the weight ratio of rhenium:platinum being at least about 1.5:1.

* * * * *